United States Patent
Jeon et al.

(10) Patent No.: US 11,550,047 B2
(45) Date of Patent: Jan. 10, 2023

(54) VEHICLE PASSENGER DETECTION DEVICE, SYSTEM INCLUDING THE SAME, AND METHOD THEREOF

(71) Applicants: HYUNDAI MOTOR COMPANY, Seoul (KR); KIA MOTORS CORPORATION, Seoul (KR); LS AUTOMOTIVE TECHNOLOGIES CO., LTD., Anyang-si (KR); INDUSTRY-UNIVERSITY COOPERATION FOUNDATION HANYANG UNIVERSITY, Seoul (KR)

(72) Inventors: Seul Ki Jeon, Suwon-si (KR); Gyun Ha Kim, Incheon (KR); Eung Hwan Kim, Seoul (KR); Beom Young Oh, Gunpo-si (KR); Sung Ho Cho, Seoul (KR); Jung Woo Choi, Seoul (KR); Tae Gon Lim, Siheung-si (KR); Jae Ho Huh, Seoul (KR); Bong Gi Song, Hwaseong-si (KR); Joo Seong Seo, Incheon (KR)

(73) Assignees: HYUNDAI MOTOR COMPANY, Seoul (KR); KIA MOTORS CORPORATION, Seoul (KR); LS AUTOMOTIVE TECHNOLOGIES CO., LTD., Anyang-si (KR); INDUSTRY-UNIVERSITY COOPERATION FDN. HANYANG UNI., Seoul (KR)

( * ) Notice: Subject to any disclaimer, the term of this patent is extended or adjusted under 35 U.S.C. 154(b) by 657 days.

(21) Appl. No.: 16/546,989

(22) Filed: Aug. 21, 2019

(65) Prior Publication Data
US 2020/0116847 A1   Apr. 16, 2020

(30) Foreign Application Priority Data

Oct. 15, 2018   (KR) .................. 10-2018-0122594

(51) Int. Cl.
*G01S 13/04*   (2006.01)
*B60N 2/90*    (2018.01)
*B60N 2/01*    (2006.01)

(52) U.S. Cl.
CPC ............ *G01S 13/04* (2013.01); *B60N 2/01* (2013.01); *B60N 2/90* (2018.02); *B60N 2002/981* (2018.02)

(58) Field of Classification Search
None
See application file for complete search history.

(56) References Cited

U.S. PATENT DOCUMENTS 5,983,147 A * 11/1999 Krumm ............... H04N 13/239
                                                       701/28
6,516,283 B2 * 2/2003 McCall .................. G01C 21/16
                                                       702/141
(Continued)

FOREIGN PATENT DOCUMENTS

| CN | 105452898 A | * | 3/2016 | ....... B60R 21/01534 |
| KR | 20120089020 A | * | 8/2012 | |
| WO | WO-2008032220 A2 | * | 3/2008 | ............ B60W 30/10 |

*Primary Examiner* — Fekadeselassie Girma
(74) *Attorney, Agent, or Firm* — McDonnell Boehnen Hulbert & Berghoff LLP

(57) ABSTRACT

A vehicle passenger detection device, a system including the same, and a method thereof are provided. The vehicle passenger detection device includes a processor configured to determine a location of a passenger per at least one or more seats based on strength of radar signals reflected from the at least one or more seats including medium with different reflection characteristics and a storage storing information associated with strength of a radar signal for
(Continued)

each distance and information associated with strength of a radar signal according to the reflection characteristics of the medium.

20 Claims, 12 Drawing Sheets

(56) References Cited

U.S. PATENT DOCUMENTS

| | | | |
|---|---|---|---|
| 6,522,992 B1* | 2/2003 | McCall | G01C 21/16 |
| | | | 701/4 |
| 9,671,492 B2* | 6/2017 | Diewald | B60R 21/01534 |
| 11,296,715 B1* | 4/2022 | Kim | H03M 1/66 |
| 2006/0116972 A1* | 6/2006 | Wong | G06Q 30/0284 |
| | | | 705/418 |
| 2006/0208169 A1* | 9/2006 | Breed | G01S 7/4802 |
| | | | 250/221 |
| 2018/0005588 A1* | 1/2018 | Kurokawa | B60K 35/00 |
| 2018/0011180 A1* | 1/2018 | Warnick | H01Q 3/34 |
| 2020/0064784 A1* | 2/2020 | Steiner | G01S 13/50 |
| 2020/0116847 A1* | 4/2020 | Jeon | G01S 7/412 |
| 2022/0075183 A1* | 3/2022 | Lee | G02B 27/0025 |

\* cited by examiner

VEHICLE PASSENGER DETECTION DEVICE, SYSTEM INCLUDING THE SAME, AND METHOD THEREOF

CROSS-REFERENCE TO RELATED APPLICATION

This application is claims the benefit of priority to Korean Patent Application No. 10-2018-0122594, filed in the Korean Intellectual Property Office on Oct. 15, 2018, the entire contents of which are incorporated herein by reference.

TECHNICAL FIELD

The present disclosure relates to a vehicle passenger detection device, a system including the same, and a method thereof, and more particularly, relates to technologies capable of accurately detecting whether there is a passenger in a vehicle and a location of the passenger based on a radar.

BACKGROUND

With the development of vehicle technologies, services for the safety and convenience of users have been expanded. There is a seat belt reminder (SBR) system of warning users whether a seat belt is fastened depending on whether there is a passenger who rides in the vehicle among such vehicle services. A conventional SBR system may determines whether a passenger rids in the vehicle by primarily using a pressure-type sensor.

Passenger detection technologies for an SBR system which uses such a pressure-type sensor result in increased costs since a separate sensor for each seat should be mounted. In other words, as a mat sensor and a switch buckle for each seat are installed at a lower portion of the seat, the more the number of seats, the more costs increase.

Furthermore, although a load or the like is put on a seat, a conventional pressure-type sensor generates pressure, such that the SBR system misidentifies the load as a passenger.

SUMMARY

The present disclosure has been made to solve the above-mentioned problems occurring in the prior art while advantages achieved by the prior art are maintained intact.

An aspect of the present disclosure provides a vehicle passenger detection device for accurately detecting a location of a passenger in a vehicle based on a radar, a system including the same, and a method thereof.

Another aspect of the present disclosure provides a vehicle passenger detection device for reducing a size of the entire module to save costs by including a single transmitter and a single receiver for radar transmission and reception such that the single transmitter and the single receiver are in close proximity to each other and are integrated with each other, a system including the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle passenger detection device may include: a processor configured to determine a location of a passenger per at least one or more seats based on strength of radar signals reflected from the at least one or more seats including media with different reflection characteristics and a storage storing information associated with strength of a radar signal for each distance and information associated with strength of radar signals according to the reflection characteristics of the media.

The processor may be configured to determine the location of the passenger based on respective distance values from a location where the radar signal is transmitted to the at least one or more seats and the strength of the reflected radar signals, when the radar signal is received.

The processor may be configured to compare a value obtained by adding the strength of the radar signals reflected from the at least one or more seats to strength of signals reflected from passengers who sit on the at least one or more seats with a previously stored reference value and determine whether there are the passengers.

According to another aspect of the present disclosure, a vehicle system may include: at least one or more seats configured to include media having different reflection characteristics and a vehicle passenger detection device configured to determine a location of a passenger for each seat based on strength of radar signals reflected from the at least one or more seats.

The vehicle system may further include a radar device configured to receive a signal reflected after transmitting a radar signal to the at least one or more seats.

The radar device may include a single transmitter configured to transmit the radar signal and a single receiver configured to receive a radar signal reflected after being transmitted by the single transmitter.

The single transmitter and the single receiver may be integrated with each other.

The media having the different reflection characteristics may have the different reflection characteristics depending on their areas or types.

The at least one or more seats may include a first seat configured to include a first medium having a first reflection characteristic and a second seat configured to include a second medium having a second reflection characteristic different from the first reflection characteristic.

The at least one or more seats may include a first seat configured to have a first area, the first seat being comprised of a medium having a first reflection characteristic and a second seat configured to have a second area different from the first area, the second seat being comprised of the medium having the first reflection characteristic.

The first seat and the second seat may have different distances from the radar device, respectively.

The first medium having the first reflection characteristic may have a radar cross section (RCS) value greater than or equal to a first reference value. The medium having the second reflection characteristic may have an RCS value less than the first reference value.

The medium having the second reflection characteristic may include at least one or more of a metal material or an electromagnetic absorber.

The at least one or more seats may include the metal material or the electromagnetic absorber which is formed as a thin film type or a mesh type.

The at least one or more seats may include media of the thin film type or the mesh type installed on at least one or more of a lower end in a seat, a rear surface of a backrest cover of the seat, inside of a sponge of the seat, and a rear surface of the sponge of the seat.

The media having the different reflection characteristics may be included as structures of at least one or more of covers of the at least one or more seats, mounted objects in the seats, and thermal wires in the seats.

The vehicle system may further include an air conditioning device configured to provide air conditioning to the location of the passenger detected by the vehicle passenger detection device and a multimedia device configured to provide a multimedia content screen to the location of the passenger detected by the vehicle passenger detection device.

The vehicle system may further include a warning device configured to notify the passenger detected by the vehicle passenger detection device that a seat belt is not fastened.

According to another aspect of the present disclosure, a vehicle passenger detection method may include: receiving radar signals reflected from at least one or more seats including media with different reflection characteristics and determining a location of a passenger for vehicle seat based on strength of the reflected radar signals.

The determining of the location of the passenger for each vehicle seat may include comparing a value obtained by adding the strength of the radar signals reflected from the at least one or more seats to strength of signals reflected from passengers who sit on the at least one or more seats with a previously stored reference value and determining whether there are the passengers.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, a description will be given in detail of embodiments of the present disclosure with reference to FIGS. 1 to 8.

Figure 1:
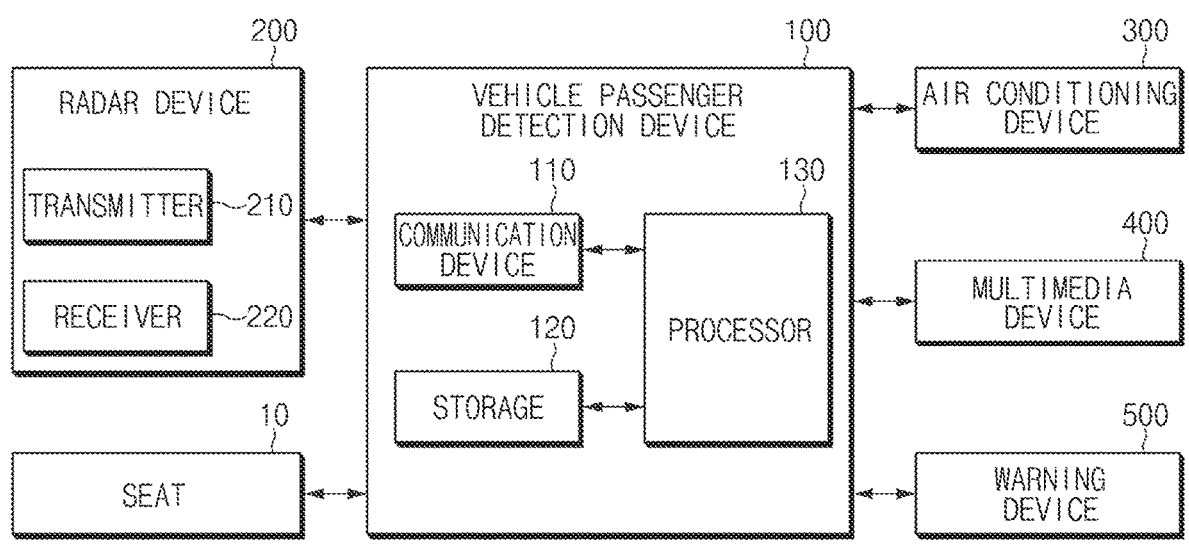
FIG. 1 is a block diagram illustrating a configuration of a vehicle system including a vehicle passenger detection device according to an embodiment of the present disclosure.

FIG. 1 is a block diagram illustrating a configuration of a vehicle system including a vehicle passenger detection device according to an embodiment of the present disclosure. The vehicle system of FIG. 1 may be loaded into a vehicle.

Referring to FIG. 1, the vehicle system according to an embodiment of the present disclosure may include a vehicle passenger detection device 100, a radar device 200, an air conditioning device, a multimedia device 400, and a warning device 500.

The vehicle passenger detection device 100 may determine a location of a passenger for each seat based on strength of radar signals reflected from at least one or more seats 10 respectively including media with different reflection characteristics.

To this end, the vehicle passenger detection device 100 may include a communication device 110, a storage 120, and a processor 130.

The communication device 110 may be a hardware device implemented with various electronic circuits to transmit and receive a signal over a wireless or wired connection. In an embodiment of the present disclosure, the communication device 110 may perform in-vehicle communication through controller area network (CAN) communication, local interconnect network (LIN) communication, or the like and may communicate with the radar device 200, the seat 10, the air conditioning device 300, the multimedia device 400, the warning device 500, or the like.

The storage 120 may store information, such as a reflection characteristic of a radar signal for each seat, a reflection characteristic of a radar signal of a human body, or a reflection characteristic of a radar signal for each distance, in advance. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communication device 110, the storage 120, the radar device 200, the seat 10 the air conditioning device 300, the multimedia device 400, the warning device 500, or the like and may electrically control the respective components. The processor 130 may be an electrical circuit which executes instructions of software and may perform a variety of data processing and calculation described below.

The processor 130 may determine a location of a passenger for each seat based on strength of radar signals reflected from the at least one or more seats 10 respectively including media with different reflection characteristics.

In other words, when a radar signal is received, the processor 130 may determine a location of a passenger in a vehicle based on each distance value from a location where the radar signal is transmitted by the radar device 200 to the at least one or more seats 10 and strength of the reflected radar signal.

The processor 130 may compare a value obtained by adding strength of radar signals reflected from the at least one or more seats 10 to strength of signals reflected from passengers who sit on the at least one or more seats 10 with a previously stored reference value to determine whether there are the passengers. The processor 130 may determine a human body or a living body using a sensor which senses biometric characteristics such as a heartbeat or breathing.

The seat 10 may be a place for a passenger to sit in the vehicle. The seat 10 may include media or material with different reflection characteristics of a radar signal. The at least one or more seats 10 may each include media with different reflection characteristics. A radar cross section (RCS) value referring to a reflection degree of a signal may be common (e.g., greater than or equal to a first reference value) in an existing car seat. An RCS value may be very low (e.g., less than the first reference value) in media such as a metal material and an electromagnetic absorber. In this case, different media mounted each on the at least one or more seats 10 may have different reflection characteristics, respectively, and may have reflection characteristics distinguished from reflection characteristics of a human body.

Figure 3:
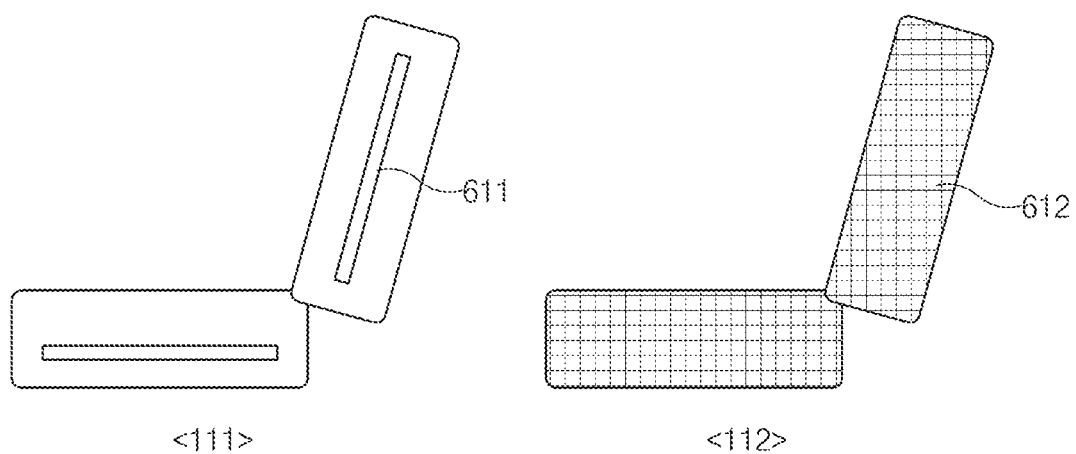
FIG. 3 is a drawing illustrating a location and medium of a seat according to another embodiment of the present disclosure.
Figure 4:
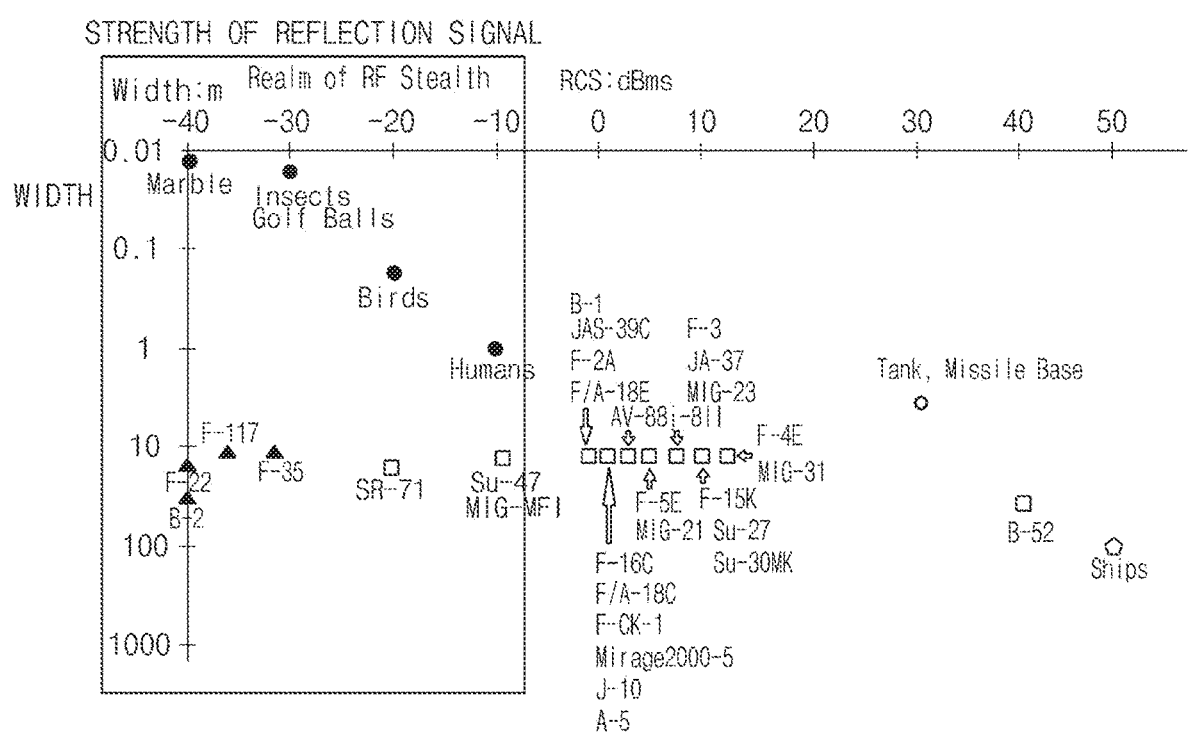
FIG. 4 is a graph illustrating strength of a reflection signal for each area (size) of a target according to an embodiment of the present disclosure.

FIG. 3 is a drawing illustrating a location and medium of a seat according to another embodiment of the present disclosure. Referring to FIG. 3, a mesh-type medium 112, a thin-film type medium 111, or the like may be manufactured to be mounted on a bottom of a seat cover or a rear surface of a backrest cover. In other words, a metal thin film 611 may be loaded into a seat, and a metal grid 612 of a mesh type may be mounted on the entire region in the seat. In this case, although a medium is loaded into a sponge or is mounted on a rear surface of the sponge to prevent a seam or the like, an RCS value may be maintained. Furthermore, a structure of each medium may have design convenience depending on a reflection degree of each medium. Furthermore, a medium with such a different reflection characteristic may vary with its area as well as its type. FIG. 4 is a graph illustrating strength of a reflection signal for each area (size) of a target according to an embodiment of the present disclosure. Referring to FIG. 4, the larger an area of a medium, the higher reflection strength of a radar signal. Thus, although types of media are the same as each other, when areas of the media differ from each other, reflection characteristics of the media may be differently implemented. As such, an embodiment of the present disclosure may distinguish a passenger for each same distance based on a difference between reflection degrees of signals according to a medium characteristic for each seat and may distinguish locations of passengers who sit on seats on the same distance as well as determine whether there is a passenger.

Figure 2A:
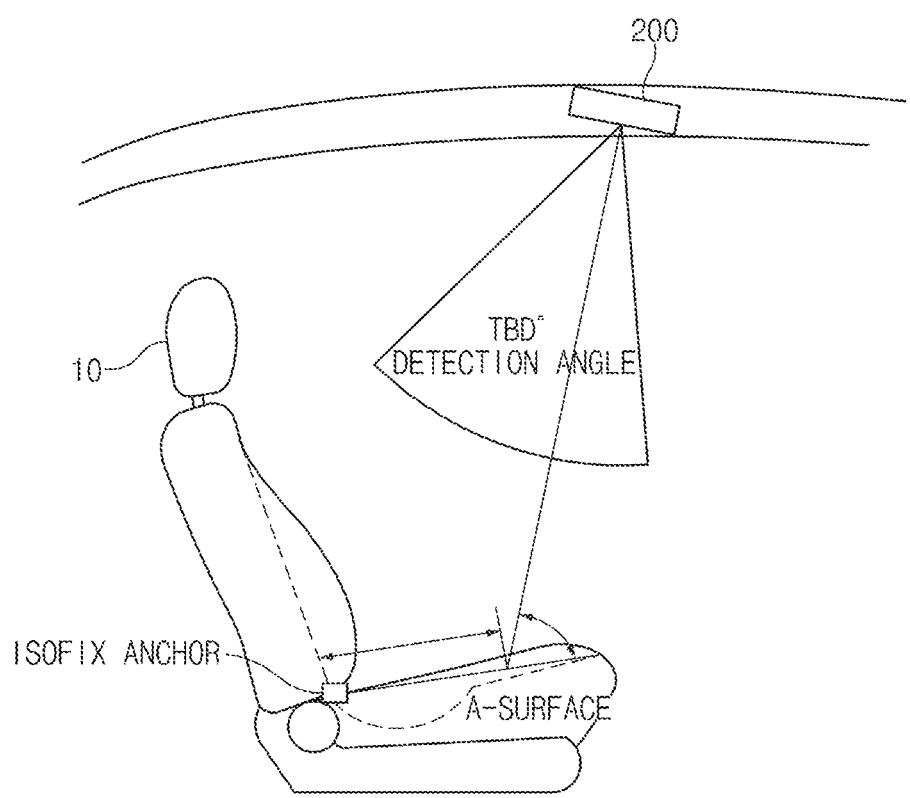
FIG. 2A is a side view illustrating locations where a seat and a radar device are mounted in a vehicle, according to an embodiment of the present disclosure.
Figure 2B:
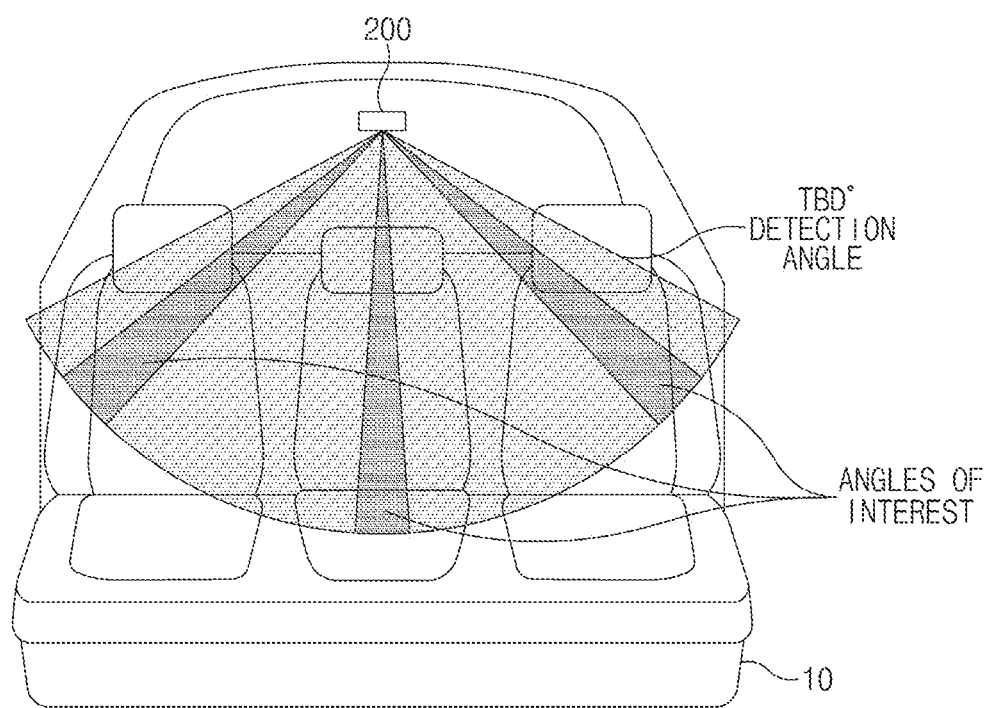
FIG. 2B is a front view illustrating locations where seats and a radar device are mounted in a vehicle, according to an embodiment of the present disclosure.

Referring again to FIG. 1, the radar device 200 may include a single transmitter 210 and a single receiver 220. The single transmitter 210 and the single receiver 220 may be configured as a separation type or an integrated type. Compared with a manner to include a single transmitter and multiple receivers, such a manner to include the single transmitter 210 and the single receiver 220 may be integrated with each other and may be in close proximity to each other to be implemented to a small size, resulting in saved costs. As such, the radar device 200 may have a composition of a pair of transmitter (transmit antenna) and receiver (receive antenna) and may have less restrictions on a mounting structure than a structure of using a plurality of receive antennas and transmit antennas. FIG. 2A is a side view illustrating locations where a seat and a radar device are mounted in a vehicle, according to an embodiment of the present disclosure. FIG. 2B is a front view illustrating locations where a seat and a radar device are mounted in a vehicle, according to an embodiment of the present disclosure. Referring to FIGS. 2A and 2B, a radar device 200 may be installed above a seat 10 on a ceiling in a vehicle. Furthermore, an ultrasonic sensor is unable to sense an infant in a sleeping state, an infant on a car seat converted by a shield window, or the like, so an embodiment of the present disclosure uses a radar.

Return to FIG. 1, the air conditioning device 300 may provide air conditioning or heating for each vehicle seat. In this case, when a location of a passenger is detected by the vehicle passenger detection device 100, the air conditioning device 300 may provide air conditioning or heating to a seat corresponding to the location of the passenger.

The multimedia device 400 may be mounted for each front surface of a vehicle seat and may provide a 1:1 screen to a passenger per seat. In other words, the multimedia device 400 may be mounted for each front surface of a seat in a vehicle to output desired multimedia content for each passenger. To this end, when a location of the passenger is accurately detected by the vehicle passenger detection device 100, the multimedia device 400 installed in front of the seat on which the detected passenger is located may play back multimedia content or the like. The multimedia device 400 may be implemented as a head-up display (HUD), a cluster, an audio video navigation (AVN), or the like. Furthermore, a color input or the like may be directly received from a user using a user setting menu (USM) of the cluster. Moreover, the multimedia device 400 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display. and a three-dimensional (3D) display. Some thereof may be implemented as transparent displays configured as a transparent type or a semi-transparent type to see the outside. Moreover, the multimedia device 400 may be implemented as a touchscreen including a touch panel to be used as an input device other than an output device.

The warning device 500 may determine whether an object put on the seat 10 is a person or a load using the vehicle passenger detection device 100. When the object is determined as the person, the warning device 500 may warn the person to fasten his or her seat belt depending on whether he or she fastens the seat belt. Thus, the vehicle passenger detection device 100 may prevent a false warning from occurring since a seat belt is not fastened, after misidentifying a load as a passenger when the load is put on the seat 10.

As such, an embodiment of the present disclosure may verify various locations (the left and right) for passengers of a second row and a third row in the vehicle by using various media mounted on seats of the vehicle and may increase detection accuracy. Thus, an embodiment of the present disclosure may increase accuracy of a vehicle service capable of being provided after detecting a location of a passenger, for example, air conditioning control for each location, providing a convenience function, notification that a seat belt is not fastened, or the like.

Moreover, an embodiment of the present disclosure may provide air conditioning and display content for each passenger by ascertaining accurate locations of passengers. Furthermore, an embodiment of the present disclosure may identify a passenger or an object for each location to prevent a false alarm (e.g., prevent an alarm from being rung when an object is put on a seat) using a seat belt reminder (SBR) function.

Figure 5A:
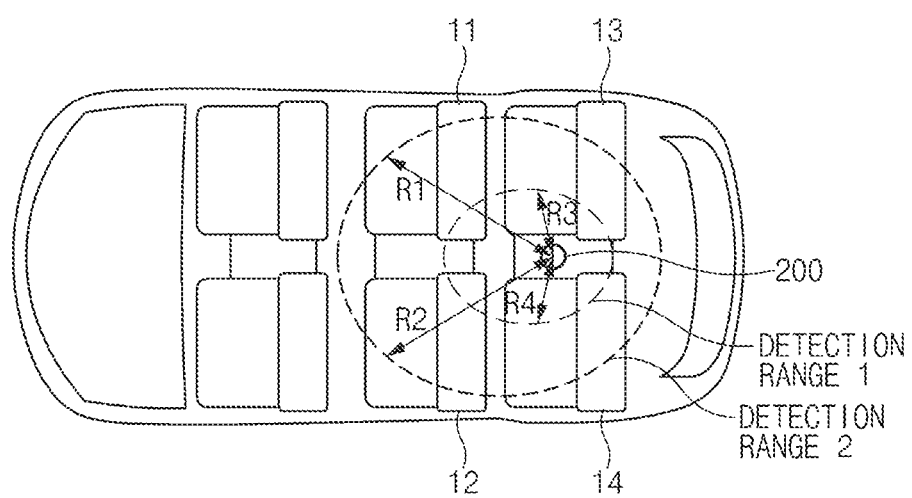
FIG. 5A is a drawing illustrating a detection range according to a location of a radar device loaded into a vehicle according to an embodiment of the present disclosure.
Figure 5B:
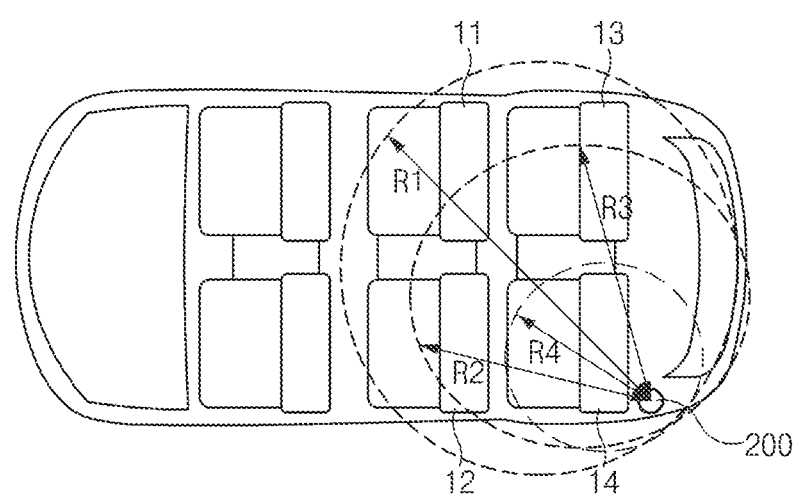
FIG. 5B is a drawing illustrating a detection range according to a location of a radar device loaded into a vehicle according to another embodiment of the present disclosure.

FIG. 5A is a drawing illustrating a detection range according to a location of a radar device loaded into a vehicle according to an embodiment of the present disclosure. FIG. 5B is a drawing illustrating a detection range according to a location of a radar device loaded into a vehicle according to another embodiment of the present disclosure.

FIG. 5A illustrates a detection range when a radar device 200 is located in the center of a third row of a vehicle (the center behind the vehicle). In this case, the detection range may include a distance or time where or when a radar signal is reflected and returned.

When a distance from the radar device 200 to seat 11 is R1, when a distance from the radar device 200 to seat 12 is R2, when a distance from the radar device 200 to seat 13 is R3, and when a distance from the radar device 200 to seat 14 is R4, compared with distances from the radar device 200 to the respective seats, R1=R2>R3=R4. Thus, after the radar device 200 transmits a radar signal, when it receives a reflected and returned signal, seats 11 and 12, each of which has the same distance from the radar device 200, may have the same characteristics of the reflected signals and seats 13 and 14, each of has the same distance from the radar device 200, may have the same characteristics of the reflected signals.

Table 1 below represents an example of characteristics of a radar receive signal for each seat and an example of calculating a radar receive signal for each seat when there is a passenger.

TABLE 1

| | |
|---|---|
| $r(t) = n(t)$:<br>a radar receive signal when there is no passenger | Equation 1 |
| $r_1(t) = h_1(t) + n(t)$:<br>a signal when a passenger sits on seat 11 | Equation 2 |

TABLE 1-continued

| | |
|---|---|
| $r_2(t) = h_2(t) + n(t)$:<br>a signal when a passenger sits on seat 12 | Equation 3 |
| $r_3(t) = h_1(t) + h_2(t) + n(t)$:<br>a signal when passengers sit on seats 11 and 12 | Equation 4 |

In these equations, r(t) denotes the radar receive signal, $r_1(t)$ denotes the radar receive signal when there is the passenger on seat 11, $r_2(t)$ denotes the radar receive signal when there is the passenger on seat 12, $r_3(t)$ denotes the radar receive signal when there are both the passengers on seats 11 and 12, $h_1(t)$ denotes the signal of the living body who sits on seat 11, and $h_2(t)$ denotes the signal of the living body who sits on seat 12. An embodiment of the inventive concept may consider a companion animal as well as a passenger.

In this case, since seats 11 and 12 have the same distance from the radar device 200, although signals of $h_1(t)$ and $h_2(t)$ are detected, a vehicle passenger detection device 100 of FIG. 1 may fail to identify whether a passenger sits on seat 11 or 12. In other words, when a signal of $r_1(t)$ of Equation 2 above is received, the vehicle passenger detection device 100 may identify that a passenger sits on one of seats 11 and 12, but may fail to verify whether the passenger sits on seat 11 or 12.

FIG. 5B illustrates a detection range when the radar device 200 is located at a left seat of a third row of the vehicle (at a left end behind the vehicle). When a distance from the radar device 200 to sear 11 is R1, when a distance from the radar device 200 to sear 12 is R2, when a distance from the radar device 200 to sear 13 is R3, and when a distance from the radar device 200 to sear 14 is R4, compared with distances from the radar device 200 to the respective seats, R1>R2=R3>R4. Thus, after the radar device 200 transmits a radar signal, when it receives a reflected and returned signal, radar reflection signals from seats 12 and 13 may be the same as each other, such that the vehicle passenger detection device 100 may fail to distinguish whether a passenger sits on seat 12 or 13.

Thus, in an embodiment of the present disclosure, a medium or material of each seat may be differently made such that a reflection characteristic of a radar signal differs for each seat. A description will be given in detail below of details therefor.

Figure 6A:
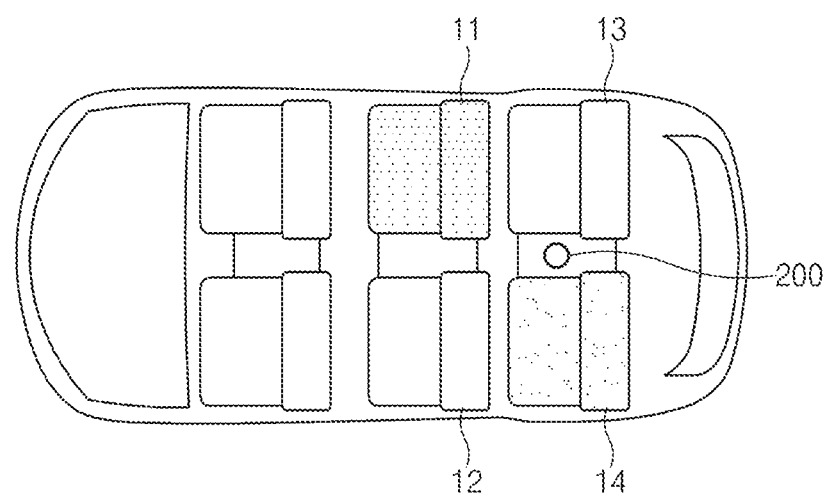
FIG. 6A is a drawing illustrating a seat medium according to a location of a radar device loaded into a vehicle according to an embodiment of the present disclosure.
Figure 6B:
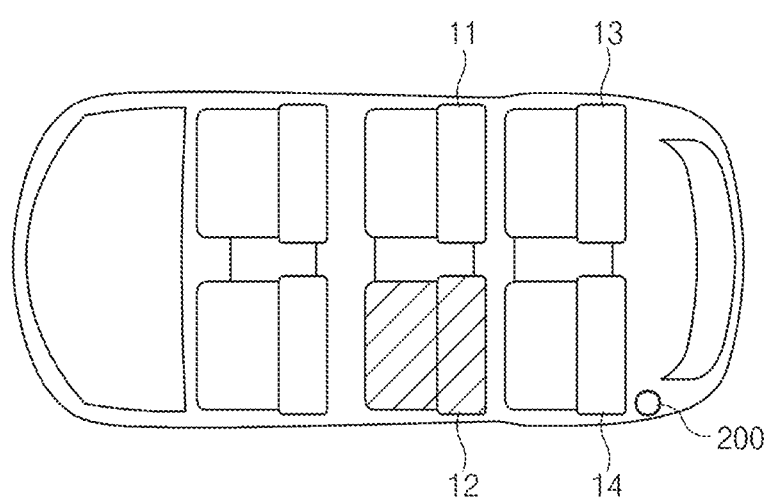
FIG. 6B is a drawing illustrating a seat medium according to a location of a radar device loaded into a vehicle according to another embodiment of the present disclosure.
Figure 6C:
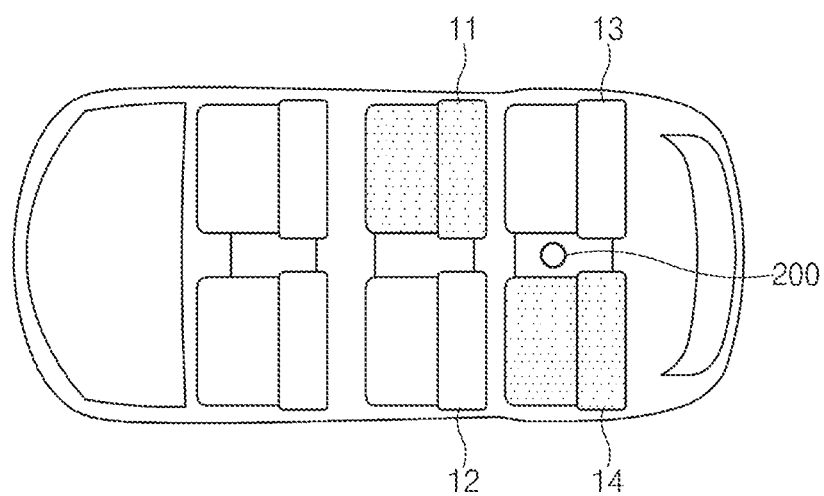
FIG. 6C is a drawing illustrating a seat medium according to a location of a radar device loaded into a vehicle according to another embodiment of the present disclosure.

FIG. 6A is a drawing illustrating a seat medium according to a location of a radar device loaded into a vehicle according to an embodiment of the present disclosure. FIG. 6B is a drawing illustrating a seat medium according to a location of a radar device loaded into a vehicle according to another embodiment of the present disclosure. FIG. 6C is a drawing illustrating a seat medium according to a location of a radar device loaded into a vehicle according to another embodiment of the present disclosure.

Referring to FIG. 6A, as shown in FIG. 5A, when a radar device 200 is located in the center of a third row of a vehicle (the center behind the vehicle), distances from the radar device 200 to seats 11 and 12 may be the same as each other and distances from the radar device 200 to seats 13 and 14 may be the same as each other. It may be difficult to distinguish a location of a passenger who sits on seat 11 or 12. It may be difficult to distinguish a location of a passenger who sits on seat 13 or 14. To address this issue, FIG. 6A illustrates an example of including a specific medium in seat 11 to distinguish between seat 11 and seat 12 and including a specific medium in seat 14 to distinguish between seat 13 and seat 14. In other words, specific medium may be asymmetrically included in seats in a vehicle such that reflection characteristics of radar signals reflected from the seats differ from each other, such that a vehicle passenger detection device 100 of FIG. 1 may distinguish the seats although distances between a radar device 200 of FIG. 1 and the several seats.

In this case, such a specific medium may be configured as a medium with a large difference of an RCS value which refers to a reflection level of a radar signal and may be configured as a thin metal material, a metal grid of a mesh structure, an electromagnetic absorber, or the like, which is distinguished from a general car seat. Furthermore, the specific medium may be mounted in the form of a cover of a seat, a mounted object in the seat, a thermal wire in the seat, or the like. The general car seat may have a common RCS value, but such a specific medium may have a very low RCS value.

Table 2 below represents an example of characteristics of a radar receive signal for each seat with a different medium and an example of calculating a radar receive signal for each seat when there is a passenger. Table 2 below represents reflection characteristics of radar signals when media of seats 11 and 12 differ from each other.

TABLE 2

| |
|---|
| Equation 5 |
| $r(t) = s_1(t) + s_2(t) + n(t)$: |
| a radar receive signal when there is no passenger |
| Equation 6 |
| $r_1(t) = h_1(t) + s_2(t) + n(t)$: |
| a signal when a passenger sits on seat 11 |
| Equation 7 |
| $r_2(t) = s_1(t) + h_1(t) + n(t)$: |
| a signal when a passenger sits on seat 12 |
| Equation 8 |
| $r_3(t) = h_1(t) + h_2(t) + n(t)$: |
| a signal when passengers sit on seats 11 and 12 |

When $s_1(t)$ is a reflection signal from seat 11 and when $s_2(t)$ is a reflection signal from seat 12, the radar receive signal when there is no passenger on the seat may be represented as Equation 5 above. Meanwhile, the radar signal when the passenger sits on seat 11 may be represented as Equation 6 above. The radar signal when the passenger sits on seat 12 may be represented as Equation 7 above. The radar signal when the passengers sit on seats 11 and 12 may be represented as Equation 8 above. As such, media with different reflection characteristics may be mounted on seats 11 and 12, each of which has the same distance from the radar device 200, respectively, such that values of $r_1(1)$ and $r_2(t)$ differ from each other, so the vehicle passenger detection device 100 may determine whether the passenger is located on seat 11 or 12. In other words, the vehicle passenger detection device 100 may determine locations of the passengers using values of the radar signals calculated using Equations 6 and 7 above. In other words, since it is difficult to penetrate a radar signal because most of the human body is comprised of water, when a passenger sits on seat 11, seat 11 may be hidden by the passenger, so most of the radar signal may be reflected by the passenger and most of a reflection signal from seat 11 may disappear. Thus, when both the passengers sit on seats 11 and 12 like Equation 8 above, seats 11 and 12 may be hidden by the passengers, respectively, so only a signal reflected from the passengers may remain.

When $s_1(t)$ and $s_2(t)$ are previously stored in a storage 120 of FIG. 1 and when the passenger is located on seat 11 like Equation 6 above, a radar signal may be reflected from the passenger and a signal of $h_1(t)$ rather than $s_1(t)$ may be added to the radar signal to calculate the radar receive signal $r_1(t)$. As such, the vehicle passenger detection device 100 may previously store a strength value of a radar signal reflected from a seat on which there is no passenger. Thereafter, upon calculating the sum of strength of reflected signals, when a value different from the previously stored value is added, the vehicle passenger detection device 100 may detect that a passenger rides in a vehicle. In this case, strength $h1(t)$ of a signal reflected from the human body (living body) may be a value within a constant range and $s1(t)$ and $s2(t)$ may be stored as different values due to their reflection characteristics, such that the vehicle passenger detection device 100 ascertains a location of a passenger in a vehicle depending on the calculated value.

For example, assuming that $s_1(t)$ is 10, that $s_2(t)$ is 100, and that the magnitude of a signal of $h1(t)$ is 30, when a passenger sits on seat 11, $r_1(t)$ becomes 30+100 and $r_2(t)$ becomes 10+30, and when passengers sit on seats 11 and 12, $r_3(t)$ becomes 30+30, such that the vehicle passenger detection device 100 ascertains locations of the passengers in the vehicle using the calculated values. To this end, the storage 120 may previously store $s_1(t)$ and $s_2(t)$.

Referring to FIG. 6B, as shown in FIG. 5B, when the radar device 200 is located at a left seat of a third row in a vehicle (at a left end behind the vehicle), distances from the radar device 200 to seats 12 and 13 may be the same as each other, such that the vehicle passenger detection device 100 may fail to identify passengers who sit on seats 12 and 13. In this case, a medium of seat 12 may be implemented differently from seat 13, reflection characteristics of radar signals reflected from seats 12 and 13 may differ from each other. In this case, since seat 11, 13, or 14 has a different distance from the radar device 200, although it is comprised of the same medium, the vehicle passenger detection device 100 may detect that there is a passenger on seats 11, 13, or 14.

FIG. 6C illustrates an example in which the radar device 200 is located between seats of a third row and an example in which the same medium is mounted on seats 11 and 14 and in which seats 12 and 13 are comprised of a general seat of the vehicle. In this case, since distances from the radar device 200 to seats 11 and 12 are the same as each other, different media may be mounted each on seats 11 and 12 to distinguish reflection levels from seats 11 and 12. Furthermore, since distances from the radar device 200 to seats 13 and 14 are the same as each other, different media may be mounted on seats 13 and 14 to distinguish reflection levels from seats 13 and 14. In this case, the same first medium may be mounted on seats 11 and 14, and the same second medium may be mounted on seats 13 and 12.

Figure 7:
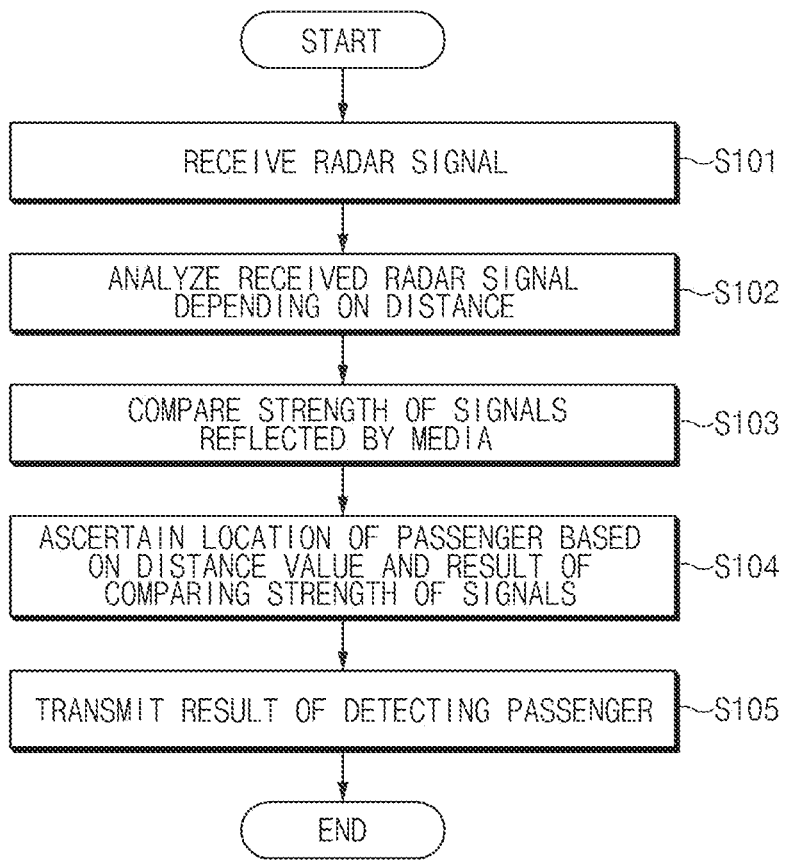
FIG. 7 is a flowchart illustrating a vehicle passenger detection method according to an embodiment of the present disclosure.

Hereinafter, a description will be given of a vehicle passenger detection method according to an embodiment of the present disclosure with reference to FIG. 7. FIG. 7 is a flowchart illustrating a vehicle passenger detection method according to an embodiment of the present disclosure.

Hereinafter, it is assumed that a vehicle passenger detection device 100 of FIG. 1 performs a process of FIG. 7. Furthermore, an operation described as being performed by the vehicle passenger detection device 100 in a description of FIG. 7 may be understood as being controlled by a processor 130 of the vehicle passenger detection device 100 of FIG. 1.

Referring to FIG. 7, after a radar device 200 transmits a radar signal, when receiving the reflected and returned radar signal in operation S101, in operation S102, the vehicle passenger detection device 100 may analyze the received radar signal depending on a distance. In other words, the vehicle passenger detection device 100 may determine whether there are several seats located at the same distance from the radar device 200, using previously stored magnitude of a radar signal, matched for each distance between a radar device and a seat.

When there are the several seats located at the same location from the radar device 200, in operation S103, the vehicle passenger detection device 100 may compare strength of reflected signals. In operation S104, the vehicle passenger detection device 100 may ascertain a location of a passenger based on the distance value and the result of comparing the strength of the signals.

In other words, like Table 2 above, when there are seats located at the same distance from the radar device 200, the vehicle passenger detection device 100 may compare strength of radar signals to determine whether there is a passenger. In this case, when there is no passenger, the vehicle passenger detection device 100 may be initialized to repeat operations S101 to S104 again.

Meanwhile, when it is determined that there is the passenger, the vehicle passenger detection device 100 may generate an alarm and transmit the generated alarm to a vehicle network (S105). Thus, when receiving information indicating that there is a passenger as the alarm, an air conditioning device 300, a display device 400, or a warning device 500 may provide a service suitable for the alarm for each location of the passenger.

As such, an embodiment of the present disclosure may more reduce costs than a manner to use a conventional pressure-type sensor by mounting media with different reflection characteristics (different reflection coefficients) on seats, each of which has the same distance from a radar device, or mounting the media to differ in size, and accurately detecting whether there is a passenger based on a radar.

Furthermore, an embodiment of the present disclosure may reduce costs by including a radar device equipped with a single transmitter and a single receiver such that the single transmitter and the single receiver are in close proximity to each other and are integrated with each other and implementing a size of the entire module to be smaller than existing technology.

Figure 8:
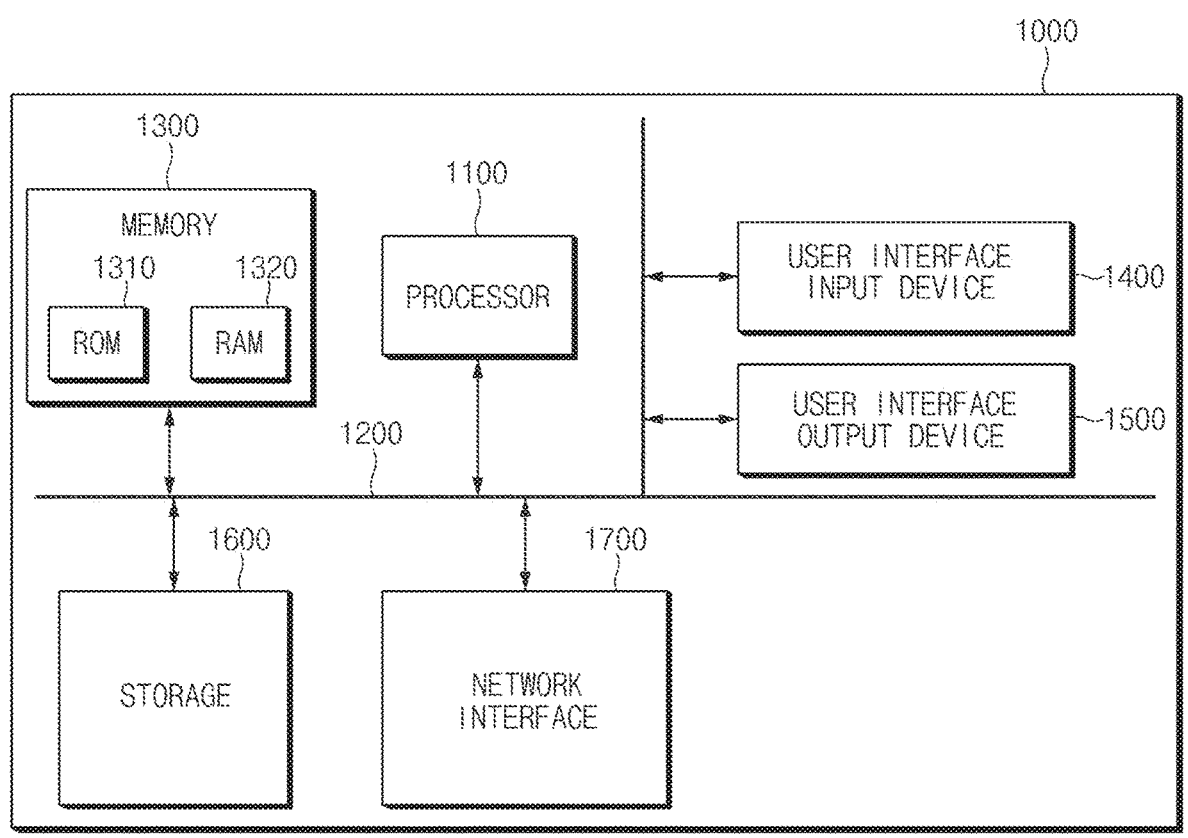
FIG. 8 is a block diagram illustrating a configuration of a computing system according to an embodiment of the present disclosure.

FIG. 8 is a block diagram illustrating a configuration of a computing system according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The technology of the present disclosure may more accurately provide a service, such as air conditioning control for each location, notification that a seat belt is not fastened, or providing a convenience function for each location to increase convenience of the user, by accurately detecting a location of a passenger in a vehicle based on a radar.

Furthermore, the technology of the present disclosure may reduce a size of the entire module to save costs by including a single transmitter and a single receiver for radar transmission and reception such that the single transmitter and the single receiver are in close proximity to each other and are integrated with each other.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A vehicle passenger detection device, comprising:
   a processor configured to determine a location of a passenger per at least one or more seats based on strength of radar signals reflected from the at least one or more seats including media with different radar reflection coefficients, wherein the media includes a metal material, an electromagnetic absorber, or a biometric material; and
   a storage storing information associated with strength of a radar signal for each distance and information associated with strength of radar signals according to the radar reflection coefficient of the media;
   wherein the processor is configured to:
      identify a first seat and a second seat using different radar reflection coefficients of the first seat and the second seat, even if a distance between a radar and the first seat, and a distance between the radar and the second seat are the same; and
      identify whether a passenger is located on the first seat or the second seat.

2. The vehicle passenger detection device of claim 1, wherein the processor is configured to:
   determine the location of the passenger based on respective distance values from a location where the radar signal is transmitted to the at least one or more seats and the strength of the reflected radar signals, when the radar signal is received.

3. The vehicle passenger detection device of claim 2, wherein the processor is configured to:
   compare a value obtained by adding the strength of the radar signals reflected from the at least one or more seats to strength of signals reflected from passengers who sit on the at least one or more seats with a previously stored reference value; and
   determine whether there are passengers.

4. A vehicle system, comprising:
- at least one or more seats configured to include media having different radar reflection coefficients, wherein the media includes a metal material, an electromagnetic absorber, or a biometric material; and
- a vehicle passenger detection device configured to determine a location of a passenger for each seat based on strength of radar signals reflected from the at least one or more seats;
- wherein the vehicle passenger detection device is configured to:
- identify a first seat and a second seat using different radar reflection coefficients of the first seat and the second seat, even if the distance between a radar and the first seat, and the distance between the radar and the second seat are the same; and
- identify whether a passenger is located on the first seat or the second seat.

5. The vehicle system of claim 4, further comprising:
- a radar device configured to receive a signal reflected after transmitting a radar signal to the at least one or more seats.

6. The vehicle system of claim 5, wherein the radar device comprises:
- a single transmitter configured to transmit the radar signal; and
- a single receiver configured to receive a radar signal reflected after being transmitted by the single transmitter.

7. The vehicle system of claim 6, wherein the single transmitter and the single receiver are integrated with each other.

8. The vehicle system of claim 4, wherein the media having the different radar reflection coefficients have the different reflection coefficients depending on their areas or types.

9. The vehicle system of claim 4, wherein the at least one or more seats comprise:
- a first seat configured to include a first medium having a first reflection coefficient; and
- a second seat configured to include a second medium having a second reflection coefficient different from the first reflection coefficient.

10. The vehicle system of claim 4, wherein the at least one or more seats comprise:
- a first seat configured to have a first area, the first seat being comprised of a medium having a first reflection coefficient; and
- a second seat configured to have a second area different from the first area, the second seat being comprised of the medium having the first reflection coefficient.

11. The vehicle system of claim 9, wherein the first seat and the second seat have different distances from the radar device, respectively.

12. The vehicle system of claim 9, wherein the first medium having the first reflection coefficient has a radar cross section (RCS) value greater than or equal to a first reference value, and
- wherein the second medium having the second reflection coefficient has an RCS value less than the first reference value.

13. The vehicle system of claim 12, wherein the medium having the second reflection coefficient comprises:
- at least one or more of a metal material or an electromagnetic absorber.

14. The vehicle system of claim 13, wherein the at least one or more seats comprise:
- the metal material or the electromagnetic absorber which is formed as a thin film type or a mesh type.

15. The vehicle system of claim 14, wherein the at least one or more seats comprise:
- media of the thin film type or the mesh type installed on at least one or more of a lower end in a seat, a rear surface of a backrest cover of the seat, inside of a sponge of the seat, and a rear surface of the sponge of the seat.

16. The vehicle system of claim 14, wherein the media having the different reflection coefficients are included as structures of at least one or more of covers of the at least one or more seats, mounted objects in the seats, and thermal wires in the seats.

17. The vehicle system of claim 4, further comprising:
- an air conditioning device configured to provide air conditioning to the location of the passenger detected by the vehicle passenger detection device; and
- a multimedia device configured to provide a multimedia content screen to the location of the passenger detected by the vehicle passenger detection device.

18. The vehicle system of claim 4, further comprising:
- a warning device configured to notify the passenger detected by the vehicle passenger detection device that a seat belt is not fastened.

19. A vehicle passenger detection method, the method comprising:
- receiving radar signals reflected from at least one or more seats including media with different radar reflection coefficients, wherein the media includes a metal material, an electromagnetic absorber, or a biometric material; and
- determining a location of a passenger for vehicle seat based on strength of the reflected radar signals;
- wherein determining a location of a passenger includes:
- identifying a first seat and a second seat using different radar reflection coefficients of the first seat and the second seat, even if the distance between a radar and the first seat, and the distance between the radar and the second seat are the same; and
- identify whether a passenger is located on the first seat or the second seat.

20. The method of claim 19, wherein the determining of the location of the passenger for each vehicle seat comprises:
- comparing a value obtained by adding the strength of the radar signals reflected from the at least one or more seats to strength of signals reflected from passengers who sit on the at least one or more seats with a previously stored reference value; and
- determining whether there are passengers.

* * * * *